P. C. BRENNAN.
SELF CONTAINED MACHINE FOR PREPARING ROAD WEARING SURFACES.
APPLICATION FILED DEC. 22, 1908.
1,020,633.
Patented Mar. 19, 1912.
6 SHEETS—SHEET 1.
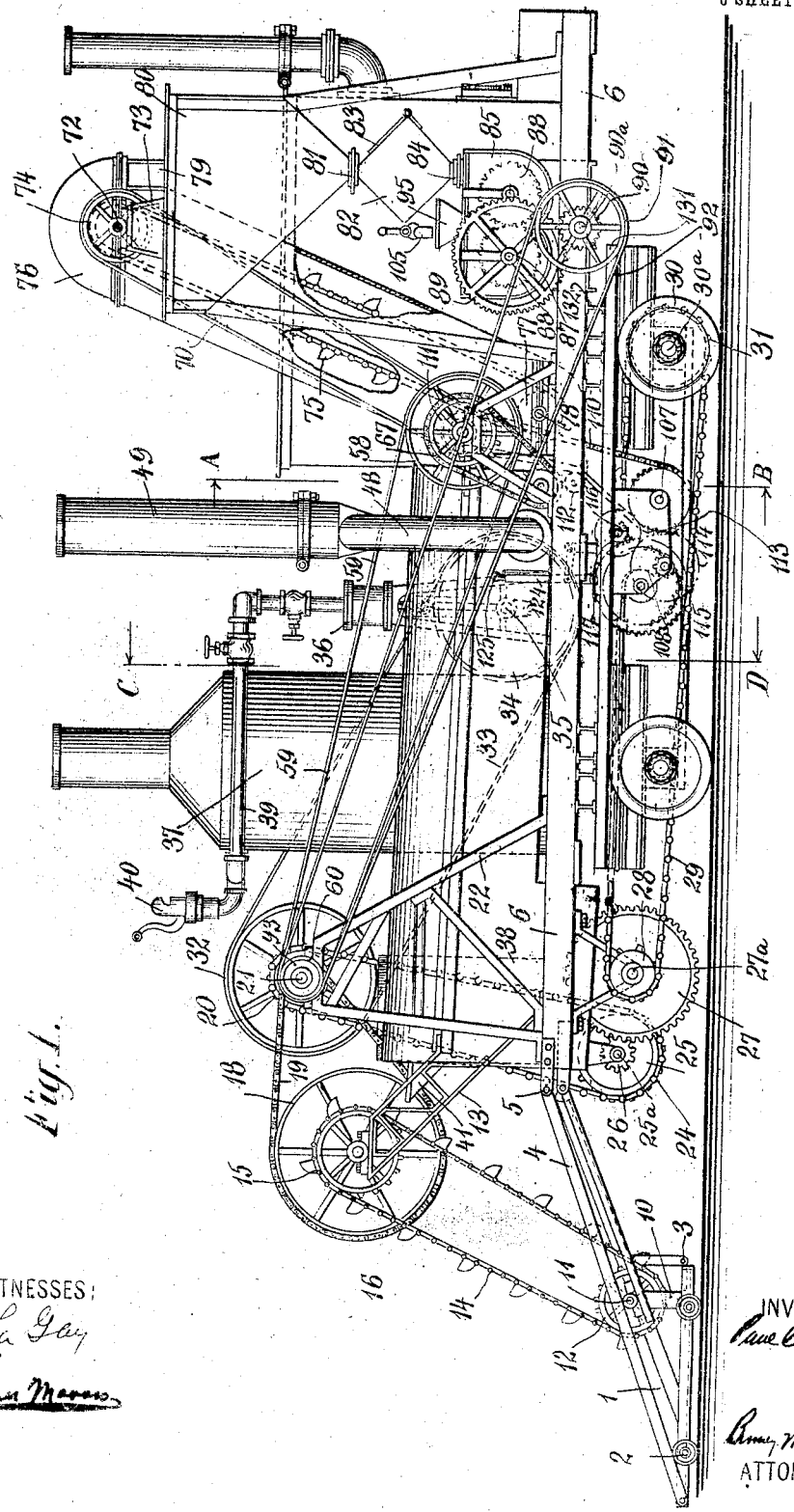

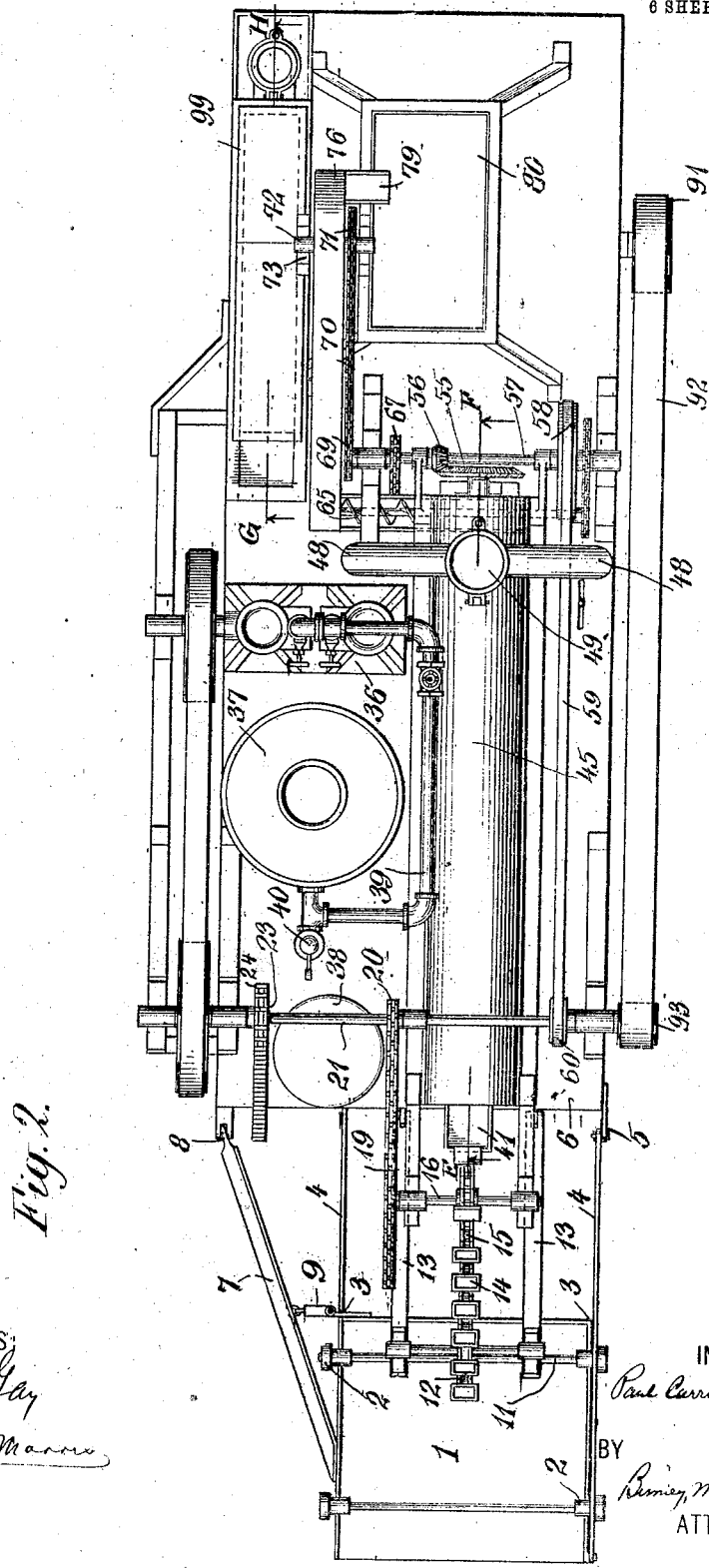

P. C. BRENNAN.
SELF CONTAINED MACHINE FOR PREPARING ROAD WEARING SURFACES.
APPLICATION FILED DEC. 22, 1908.

1,020,633.

Patented Mar. 19, 1912.

6 SHEETS—SHEET 4.

WITNESSES:
E. P. La Gay
Herman Morris

INVENTOR
Paul Carrington Brennan
BY
Munn, Mastick & Ogden
ATTORNEYS

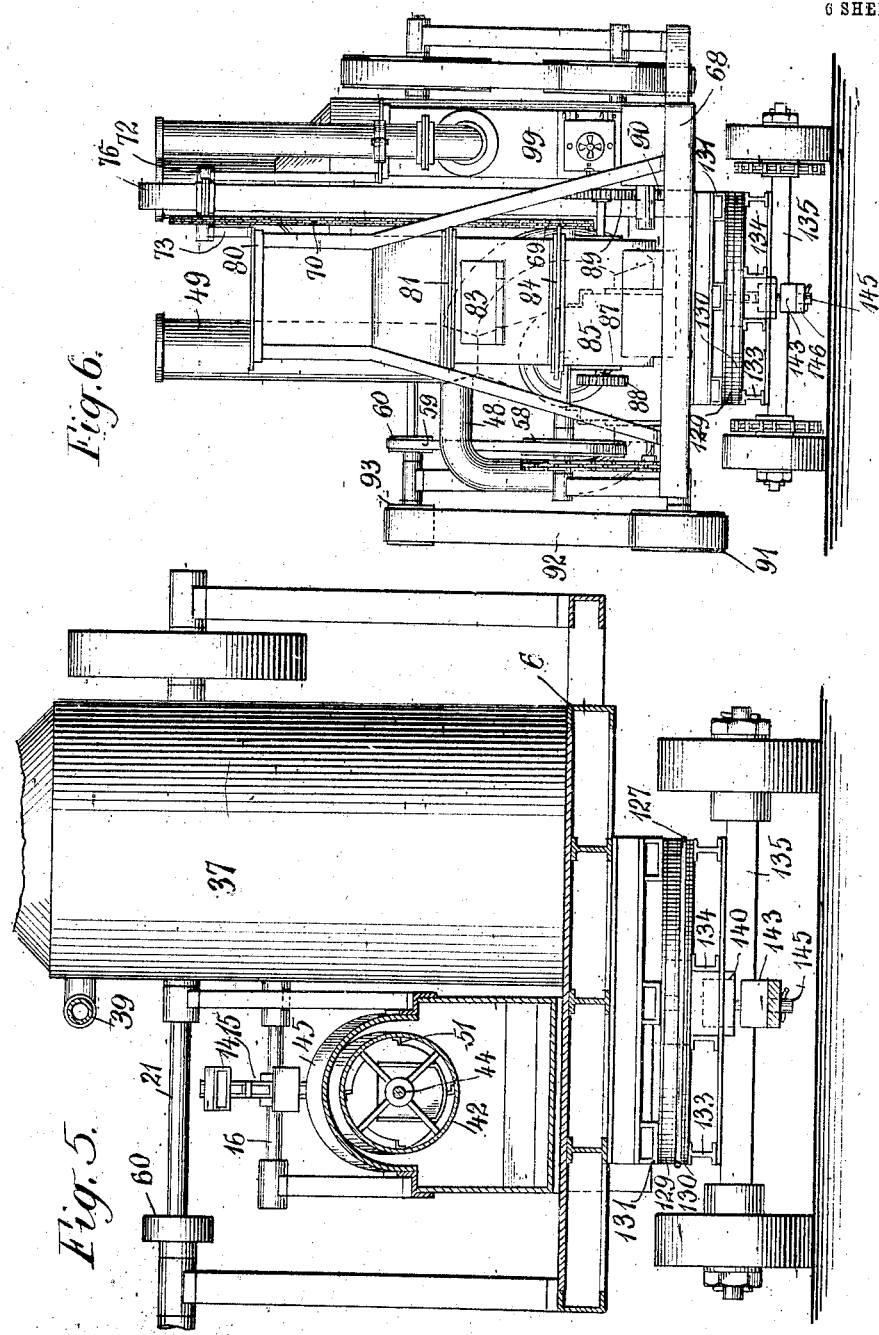

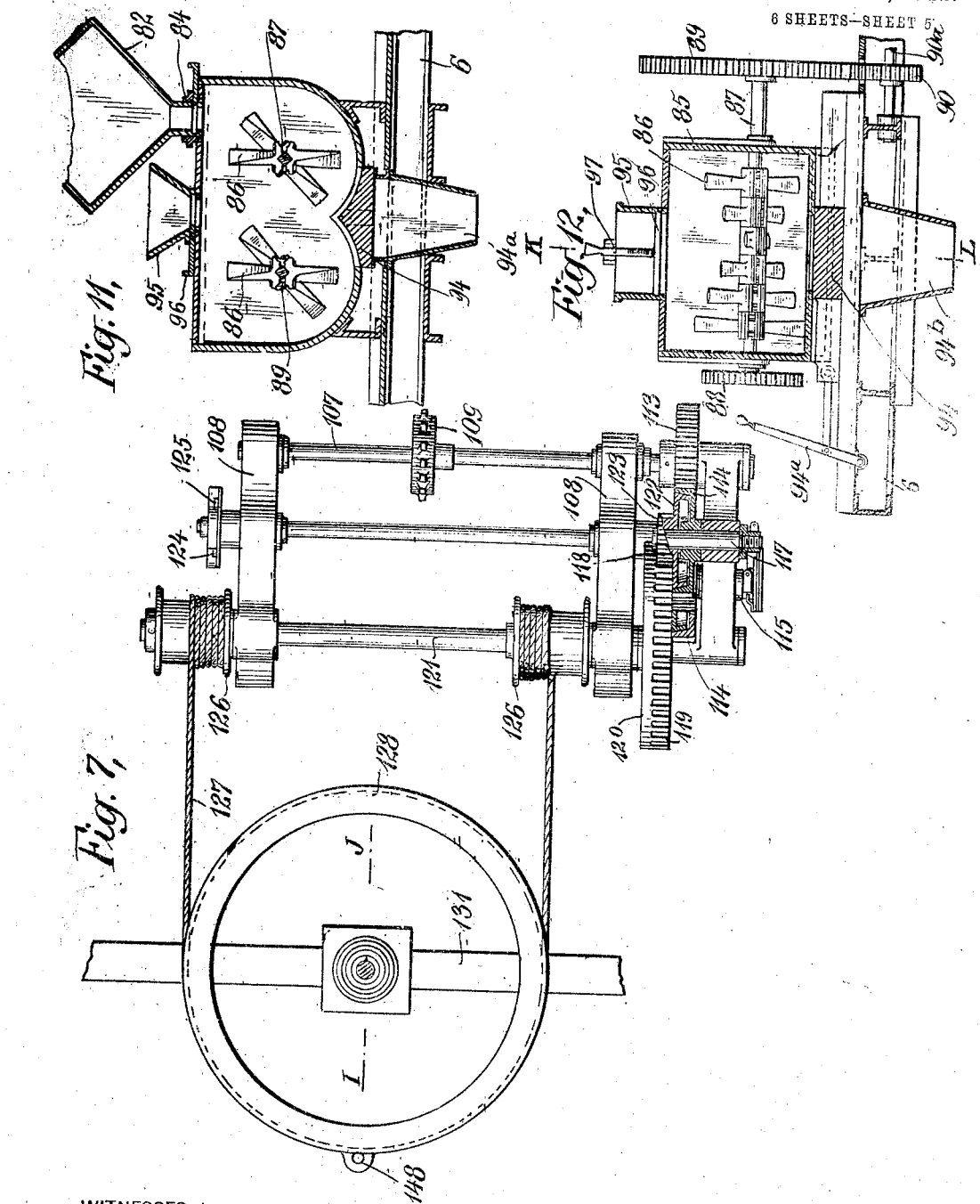

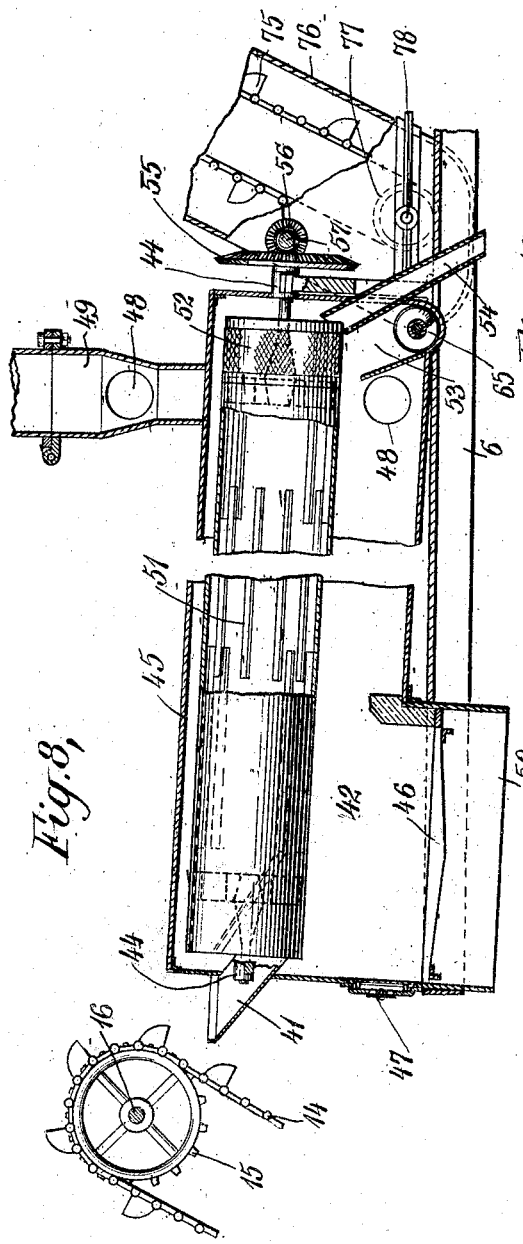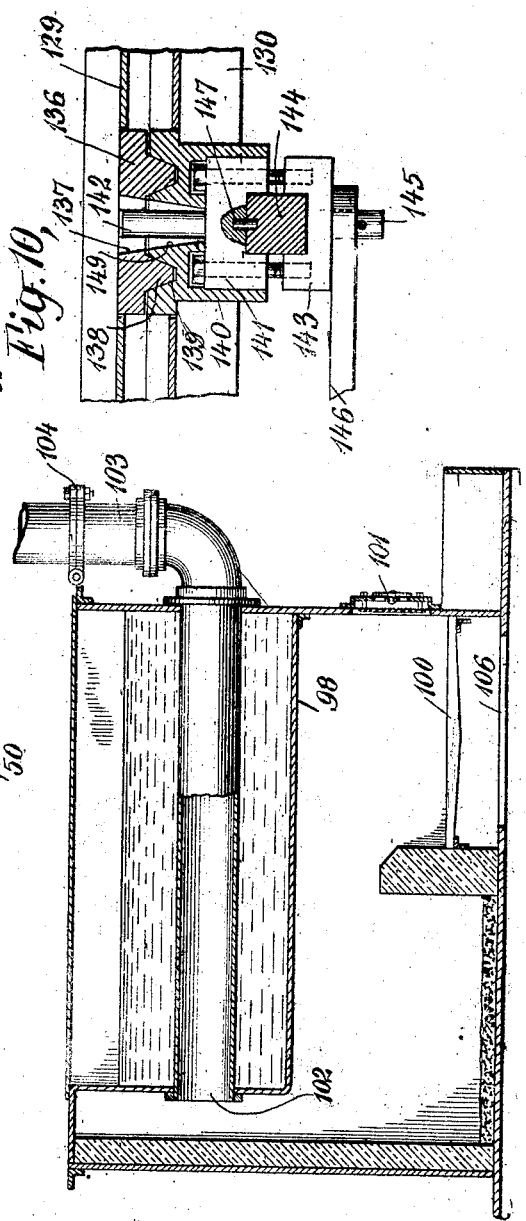

UNITED STATES PATENT OFFICE.

PAUL CARRINGTON BRENNAN, OF NEW YORK, N. Y., ASSIGNOR, BY MESNE ASSIGNMENTS, TO THE UNITED STATES ASPHALT REFINING COMPANY, OF NEW YORK, N. Y., A CORPORATION OF SOUTH DAKOTA.

SELF-CONTAINED MACHINE FOR PREPARING ROAD WEARING-SURFACES.

1,020,633.  Specification of Letters Patent.  Patented Mar. 19, 1912.

Application filed December 22, 1908. Serial No. 468,761.

*To all whom it may concern:*

Be it known that I, PAUL CARRINGTON BRENNAN, a citizen of the United States, residing in the borough of Queens, city, county, and State of New York, have invented certain new and useful Improvements in Self-Contained Machines for Preparing Road Wearing-Surfaces, of which the following is a specification.

My invention relates to a self-contained machine for preparing road wearing-surfaces, wherein the machine is self-propelled and self-contained *i. e.* contains in itself all necessary means for heating and mixing the various materials and is adapted to so mix and prepare the materials as it moves along the road, discharging the prepared material as desired ready for spreading and rolling.

In the following I have described, with reference to the accompanying drawings, an apparatus embodying one form of my invention illustrated as especially adapted for use in connection with bituminous pavements, the features thereof being more particularly pointed out hereinafter in the claims.

Figure 4:
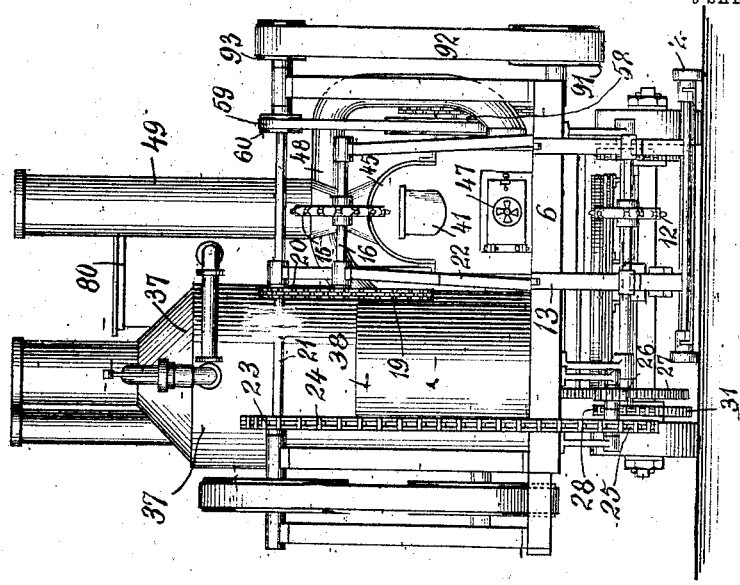
Figure 3:
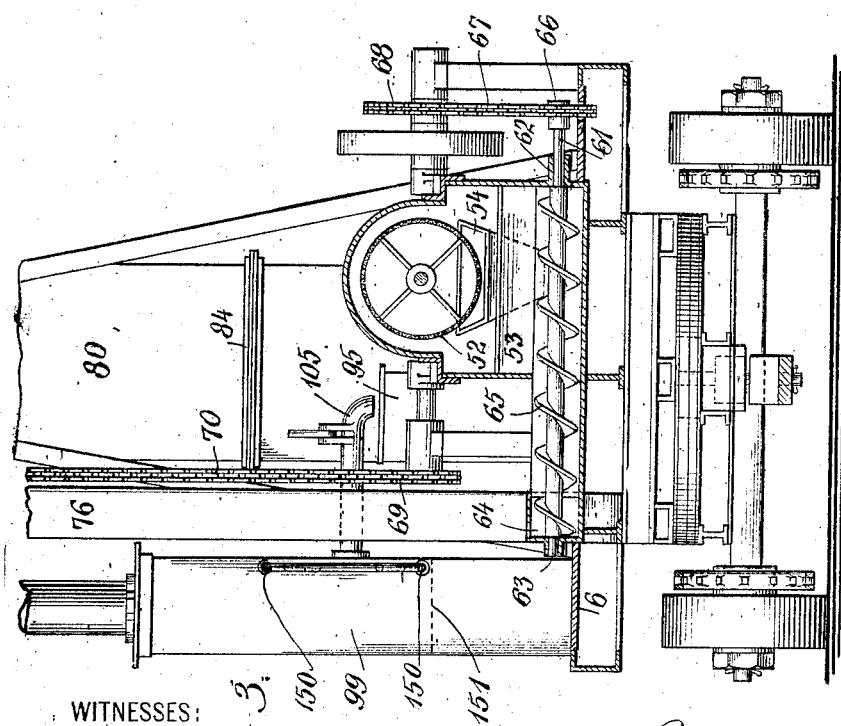

In the drawings Figure 1 is a side elevation of a machine illustrating one form of my invention, parts being broken away to more clearly show the construction. Fig. 2 is a plan view of the same, parts being removed. Fig. 3 is a sectional view along the line A—B of Fig. 1 on a slightly enlarged scale, looking in the direction of the arrows, parts being broken away. Fig. 4 is a front end elevation. Fig. 5 is a sectional view along the line C—D of Fig. 1, on a slightly enlarged scale, looking in the direction of the arrows, parts being broken away. Fig. 6 is a rear end elevation. Fig. 7 is a plan view of details of the steering means. Fig. 8 is a vertical sectional view along the line E—F of Fig. 2, looking in the direction of the arrows, parts being broken away. Fig. 9 is a vertical sectional view along the line G—H of Fig. 2. Fig. 10 is a vertical sectional view of a detail of the steering means along the line I—J of Fig. 7. Fig. 11 is a vertical sectional view of the mixer along the line K—L of Fig. 12, which latter is a side elevation, partly in section, of the same.

In the drawings similar numerals of reference indicate similar parts through the several views.

1 represents a sand or gravel receiving platform, mounted on wheels 2, 2 and hinged at 3, 3 to rods or bars 4 in turn hinged at 5 to the truck platform 6.

7 is a stay rod, swivelly connected at one end 8 to platform 6 and hooked to platform 1 at its other end. Intermediate the two ends is a coupling 9 swivelly connected to rod 7 and hinged to platform 1. The platform 1, by the means disclosed, may be swung up against the front end of the machine, assuming the form of an inverted V.

Platform 1 supports arms 10 forming a bearing for shaft 11 on which is mounted traction wheel 12.

13 are brackets supported from platform 6.

Bucket elevator 14 connects traction wheel 12 and traction wheel 15 mounted on shaft 16 supported in suitable bearings in brackets 13. Traction wheel 15 is driven by sprocket wheel 18 on shaft 16 geared by chain 19 to sprocket 20 on main driving shaft 21 supported in suitable bearings on framework 22. Main shaft 21 also carries drive wheel 23 geared by a chain 24 with sprocket wheel 25 on shaft $25^a$ hanging in suitable bearings depending from platform 6. Spur pinion 26 on shaft $25^a$ engages spur gear 27 on shaft $27^a$ carrying sprockets 28 geared by a chain 29 with sprocket 30 on axle $30^a$, thus driving wheels 31 and causing the machine to go forward or backward according to the direction of the drive wheels. Main shaft 21 is driven by pulley 32 connected by belt 33 with pulley 34 on the engine shaft 35.

36 is the engine, here shown in the form of a two cylinder steam engine, 37 is the boiler, 38 the water tank and 39 a suitably valve controlled steam pipe for conducting the steam from boiler 37 to engine 36.

40 is a suitable safety valve of any convenient style.

Bucket elevator 14 dumps its load into hopper 41, discharging into drier 42 (Fig. 8) carried by trunnions 44 supported in any suitable manner. Drier 42 is mounted in casing 45 over grate 46. Fuel is supplied to grate 46 through door 47 and the products of combustion after passing around and under drier 42 escape through pipes 48, 48 into smoke-stack 49.

50 is an ash box under grate 46 and is adapted to be emptied in any convenient manner.

Drier 42 is downwardly inclined from front to rear as shown, so that the material supplied thereto may progress by gravity from the front to the rear thereof. Ribs 51, preferably of angle iron, are mounted on the inner walls of drier 42, to assist the movement and mixing of the material as it passes therethrough. The inner end of drier 42 is provided with a circumferential screen 52 through which the finer material, such as sand, for example, will drop into hopper or trough 53 while the coarse material, such as gravel, for example, will pass out of the inner end of drier 42 and be discharged through chute 54 discharging through the platform 6 or onto the platform as desired. Drier 42 is driven by gear 55 keyed on trunnion 44 and meshing with pinion 56 mounted on cross shaft 57 supported in suitable bearings supported from platform 6. Cross shaft 57 carries a sprocket 58 connected by a chain or belt 59 with sprocket 60 on main drive shaft 21.

A shaft 61, mounted at one end in bearing 62 in the wall of casing 45, and at the other end in bearing 63 in the wall of hopper 64 carries a screw conveyer 65 adapted to receive the material from hopper 53 and convey the same to hopper 64. Shaft 61 carries a sprocket wheel 66 connected by chain 67 to sprocket wheel 68 on cross shaft 57. Cross shaft 57 also carries a sprocket wheel 69 connected by a chain 70 with a sprocket wheel 71 on shaft 72 mounted in suitable bearings on framework 73. Shaft 72 also carries a traction wheel 74 over which passes bucket conveyer 75 concealed in hood 76. The lower end of bucket conveyer 75 passes over traction wheel 77 on shaft 78 mounted in suitable bearings in the walls of hopper 64.

79 is a trough into which bucket conveyer 75 discharges and adapted to in turn discharge the material into hopper 80. Hopper 80 is closed at the bottom by a slide gate or valve 81 controlling the discharge of material from hopper 80 into measuring box 82. Box 82 is provided with an opening closed by hinged cover 83 and is also closed at the bottom by a slide gate or valve 84, controlling the discharge of material from box 82 into mixer 85. Mixer 85 is an inclosed chamber in which are mounted mixer teeth 86 on shafts 87 finding bearings in the walls of mixer 85. Shafts 87 carry spur gears 88 engaging each other. Spur wheel 89 on one of shafts 87 engages spur pinion 90 on shaft 90ᵃ on truck 6. Shaft 90ᵃ carries a pulley 91 connected by a belt 92 with pulley 93 on main driving shaft 21. The bottom of mixer 85 is closed by a slide 94 actuated by a lever 94ᵃ controlling the dumping of the mixture on the road bed through a suitable opening 94ᵇ in the floor of truck 6. Hopper 95 is mounted on mixer 85 and is closed at the bottom by a suitable gate or valve 96 controlling communication between the hopper and mixer. Hopper 95 may also be provided with a gage 97.

98 is the asphalt tank suitably supported in casing 99 on truck 6.

100 is a grate near the bottom of casing 99 to which access may be had through door 101.

102 is the flue for the escaping products of combustion from grate 100 and is preferably mounted in tank 98 so that the asphalt in said tank may be heated from both within and without.

103 is the smoke stack connecting with flue 102 and is preferably hinged as at 104.

105 is a draw off cock adapted to permit the molten asphalt from tank 98 to flow into hopper 95. The ashes from grate 100 are permitted to fall through opening 106 into any suitable ash box (not shown).

The means for steering the truck comprises a shaft 107 supported in hangers 108 depending from the floor of truck 6. Shaft 107 carries a sprocket 109 driven by chain 110 passing over sprocket 111 on cross shaft 57, chain 110 passing under idler 112 in order to hold the same free from other moving parts. Shaft 107 carries spur wheel 113 meshing with spur wheel 114 on shaft 115 and spur wheel 116 on shaft 117; shaft 115 is provided with a clutch member (not shown) adapted to cause pinion 118 feathered on shaft 115, to mesh with the internal gear 119 of wheel 120 on shaft 121, thus driving said shaft 121 in one direction. Shaft 117 is provided with a clutch 122 adapted to cause pinion 123 feathered on shaft 117 to mesh with the gear teeth on the outer periphery of wheel 120, thus driving wheel 120 and shaft 121 in the other direction.

124 and 125 indicate the clutch levers.

Shaft 121 carries drum 126, 126 on which is wound rope 127, passing around fifth wheel 128. According to the direction of rotation of shaft 121, the drums will wind and unwind respectively, thus turning the fifth wheel and thus guiding the direction of movement of the truck. The fifth wheel 128 is in two parts 129 and 130, 129 being stationary and firmly bolted, or otherwise secured to channel irons 131, in turn fastened to I-beams 132 on the bottom of truck 6.

130 is the radial or moving part of fifth wheel 128 and is fastened to I-beams 133 and channel irons 134, both of which are in turn clamped to axle 135 in any convenient manner. Block 136 having a central aperture 137 and an annular downwardly projecting ring 138 is seated in the center of stationary part 129 of the fifth wheel, as shown. Ring 138 is adapted to take into groove 139 in block 140 seated in the radial part 130 of the wheel. Block 140 is cut away so as to cap block 141 preferably integral with king bolt 142. Block 141 is bolted to block 143 on the under side of axle 144, as shown, thus clamping the same to the axle. Block 143 carries a projecting pin 145 secured to reach 146 connecting the front and rear axles.

147 is a pin seated in axle 144 and taking into block 141 to prevent the fifth wheel and its connections from shifting from side to side. Ears 148 are adapted to receive a suitable pin to lock the stationary and radial parts of the fifth wheel against movement. The blocks 136 and 140, constituting the transit plate, are provided with apertures 137 and 149 in alinement with each other and preferably in the form of inverted truncated cones to receive the king bolt 142, and to permit movement of the king bolt therein.

150, 150 indicate steam coils on the side of the asphalt tank 98 adjusted about the discharge opening into draw off cock 145 to protect the choke of said discharge by melting cold asphalt which may lodge therein. The coils 150 should preferably extend nearly to the bottom 151 of tank 98.

The operation of the apparatus disclosed and described will be clear from the description given.

It is obvious that the details of construction may be varied considerably without departing from the spirit of the invention and I do not restrict myself to any of the details shown and described, the same being so shown and described in order to illustrate one form only of an embodiment of my invention.

What I claim and desire to secure by Letters Patent is:

1. A self-contained apparatus of the character described comprising a truck, means thereon for causing the travel of said truck, a folding platform hinged to said truck and adapted to rest on the ground, a drier, an elevator adapted to convey material from said platform to said drier, a screw conveyer adapted to receive material from said drier, a mixer, an elevator adapted to convey material from said conveyer to said mixer, a tank adapted to discharge into said mixer and mechanism for operating the parts.

2. In an apparatus of the character described, a truck, a platform adapted to rest on the ground and movably secured to said truck, a main shaft, a drier, an elevator adapted to discharge material from said platform into said drier, a screw conveyer adapted to receive material from said drier, a mixer, an elevator adapted to convey material from said conveyer to said mixer, means for actuating said mixer and connections from said main shaft adapted to actuate said operating means.

In testimony whereof I have signed this specification in the presence of two subscribing witnesses.

PAUL CARRINGTON BRENNAN.

Witnesses:
SEABURY C. MASTICK,
K. G. LE ARD.